US008274775B2

(12) United States Patent
Bobert

(10) Patent No.: US 8,274,775 B2

(45) Date of Patent: Sep. 25, 2012

(54) ELECTRICAL PROTECTION COMPONENT WITH A SHORT-CIRCUITING DEVICE

(75) Inventor: Peter Bobert, Falkensee (DE)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 12/840,929

(22) Filed: Jul. 21, 2010

(65) Prior Publication Data

US 2011/0013334 A1 Jan. 20, 2011

Related U.S. Application Data

(63) Continuation of application No. PCT/EP2009/000514, filed on Jan. 27, 2009.

(30) Foreign Application Priority Data

Jan. 31, 2008 (DE) ........................ 10 2008 006 992
May 8, 2008 (DE) ........................ 10 2008 022 833

(51) Int. Cl.
*H02H 1/00* (2006.01)

(52) U.S. Cl. ........................ 361/124

(58) Field of Classification Search ................ 361/124
See application file for complete search history.

(56) References Cited

U.S. PATENT DOCUMENTS

| | | | | |
|---|---|---|---|---|
| 4,303,959 | A | 12/1981 | Roberts et al. | |
| 4,422,121 | A | 12/1983 | Baumbach | |
| 4,984,125 | A * | 1/1991 | Uwano | 361/124 |
| 5,029,302 | A | 7/1991 | Masghati et al. | |
| 5,313,183 | A | 5/1994 | Kasahara | |
| 5,371,648 | A | 12/1994 | Bonvallat | |
| 5,388,023 | A | 2/1995 | Boy et al. | |
| 5,706,161 | A | 1/1998 | Adam | |
| 6,445,560 | B1 | 9/2002 | Bobert et al. | |
| 6,864,462 | B2 * | 3/2005 | Sanoner et al. | 219/387 |

FOREIGN PATENT DOCUMENTS

| | | | |
|---|---|---|---|
| DE | 3410610 | A1 | 9/1985 |
| DE | 93 21 371 | U1 | 9/1997 |
| EP | 0 095 539 | A1 | 12/1983 |
| EP | 0 621 733 | A1 | 10/1994 |
| EP | 0 962 037 | B1 | 12/1999 |
| FR | 2 574 589 | A1 | 6/1986 |
| FR | 2 575 864 | A1 | 7/1986 |

* cited by examiner

*Primary Examiner* — Rexford Barnie
*Assistant Examiner* — Christopher Clark
(74) *Attorney, Agent, or Firm* — Slater & Matsil, L.L.P.

(57) ABSTRACT

An electrical protection component with a short-circuiting device includes a surge arrester including at least two electrodes. The electrical protection component has at least one fusible element having a geometrical form including at least one cavity. A short-circuiting link is arranged at the surge arrester, wherein the short-circuiting link presses onto the fusible element. The short-circuiting link is spaced apart from the electrodes by means of the fusible element.

24 Claims, 2 Drawing Sheets

ELECTRICAL PROTECTION COMPONENT WITH A SHORT-CIRCUITING DEVICE

This application is a continuation of co-pending International Application No. PCT/EP2009/000514, filed Jan. 27, 2009, which designated the United States and was not published in English, and which claims priority to German Application No. 10 2008 006 992.2, filed Jan. 31, 2008 and 10 2008 022 833.8, filed May 8, 2008, each of which is incorporated herein by reference.

BACKGROUND

European patent document EP 0 962 037 B1, U.S. Pat. No. 6,445,560, discloses a gas-filled surge arrester with an external short-circuiting device.

SUMMARY

In one aspect, of the present invention specifies an electrical protection component that has a short-circuiting device that responds rapidly.

An electrical protection component with a short-circuiting device includes a surge arrester comprising at least two electrodes. The surge arrester has a hollow body, at which at least two electrodes are arranged. A two-electrode arrester has an integral ceramic hollow body. In the case of a three-electrode arrester, the ceramic hollow body is subdivided into two separate parts by means of a central electrode. The two parts are arranged with a first side at a central electrode. An end electrode is respectively arranged at a second side of the two parts.

The electrical protection component comprises at least one fusible element. The electrical protection component comprises a short-circuiting device, which is arranged at the surge arrester. The short-circuiting device serves, in the event of excessively high heating of the arrester, to short-circuit the electrodes of the arrester, such that the current no longer flows through the arrester, but rather via the short-circuiting device. In one preferred embodiment, the short-circuiting device comprises a short-circuiting link, which is prestressed and presses onto the fusible element by virtue of its spring force. The short-circuiting link is spaced apart from the electrodes of the surge arrester by the fusible element.

The fusible element has a geometrical form, wherein the geometrical form comprises at least one cavity. The cavity should be understood to mean a space which is formed by parts or sections of the fusible element. This can be either a closed space or a space having an opening toward at least one side. The space is delimited at least by two areas or sections of the fusible element.

In one preferred embodiment, the fusible element is embodied in tubular fashion. However, it is also possible for the fusible element to have the form of a slotted tube. The slot can extend partly or wholly in a longitudinal direction through the lateral surface of the tubular fusible element.

In a further embodiment, the fusible element has the form of a hollow cuboid. The hollow cuboid can have an opening toward at least one side.

In a further embodiment, the fusible element can consist of a planar material which has bends or is folded. It is also possible for the fusible element to comprise a folded film that is folded or shaped to form a polygonal body.

Preferably, the fusible element is arranged at least one end side of the electrical protection component. However, it is also possible for the fusible element to be arranged at further locations of the surge arrester, wherein it is ensured that the short-circuiting link is spaced apart from the electrodes of the surge arrester by the fusible element in the normal case.

In the event of impermissibly high heating of the surge arrester, the fusible element melts. In the event of the fusible element melting, the short-circuit link presses onto the at least two electrodes of the surge arrester and electrically connects them to one another via the short-circuiting link.

In a further embodiment, the surge arrester has a central electrode. In a variant of this type, the short-circuiting link has a connection to the central electrode. In the event of impermissibly high heating of the surge arrester, the short-circuiting link establishes a connection of the two electrodes to the central electrode via the short-circuiting link.

Preferably, the fusible element consists of an insulating plastic. By way of example, polypropylene or other plastics having electrically insulating properties are suitable for this purpose.

In one preferred embodiment, the fusible element has the form of an injection-molded part. Any desired geometrical forms can be produced by means of an injection-molding method.

Preferably, the fusible element is arranged in such a way that the greatest stiffness of the fusible element is directed in the direction of the compressive force exerted by the short-circuiting link.

The fusible element has a small amount of material, but the fusible element has a high static strength with respect to the small amount of material. By using the least possible amount of material to be melted, it is possible to achieve a fast switching operation of the short-circuiting device.

In comparison with an electrical protection component wherein a film is used as an insulating element between the short-circuiting link and electrodes of the surge arrester, in the case of an electrical protection component with a fusible element as described above, it is possible to produce a larger distance between the short-circuiting link and electrodes. This reduces the risk of a sparkover, even if the fusible element is not situated directly between the contact area of the short-circuiting link and the surge arrester.

In the case where the electrodes of the surge arrester are short-circuited by means of the short-circuiting link, or in the event of impermissibly high heating of the surge arrester, plastic material of the fusible element is preferably as far as possible no longer situated between the contact areas of the short-circuiting link and the electrodes, with the result that a reliable electrical contact between the short-circuiting link and the electrodes is ensured.

Through the choice of corresponding plastics and geometries, it is thus possible to cover a correspondingly large temperature range, as a result of which the response behavior of the short-circuiting device can also be influenced.

BRIEF DESCRIPTION OF THE DRAWINGS

The subject described above will be explained in greater detail on the basis of the following figures and exemplary embodiments.

The drawings described below should not be regarded as true to scale. Rather, individual dimensions may be illustrated as enlarged, reduced in size or even distorted, for the sake of improved illustration. Elements which are resembling one another or which perform the same function are designated by the same reference symbols.

Figure 1A:
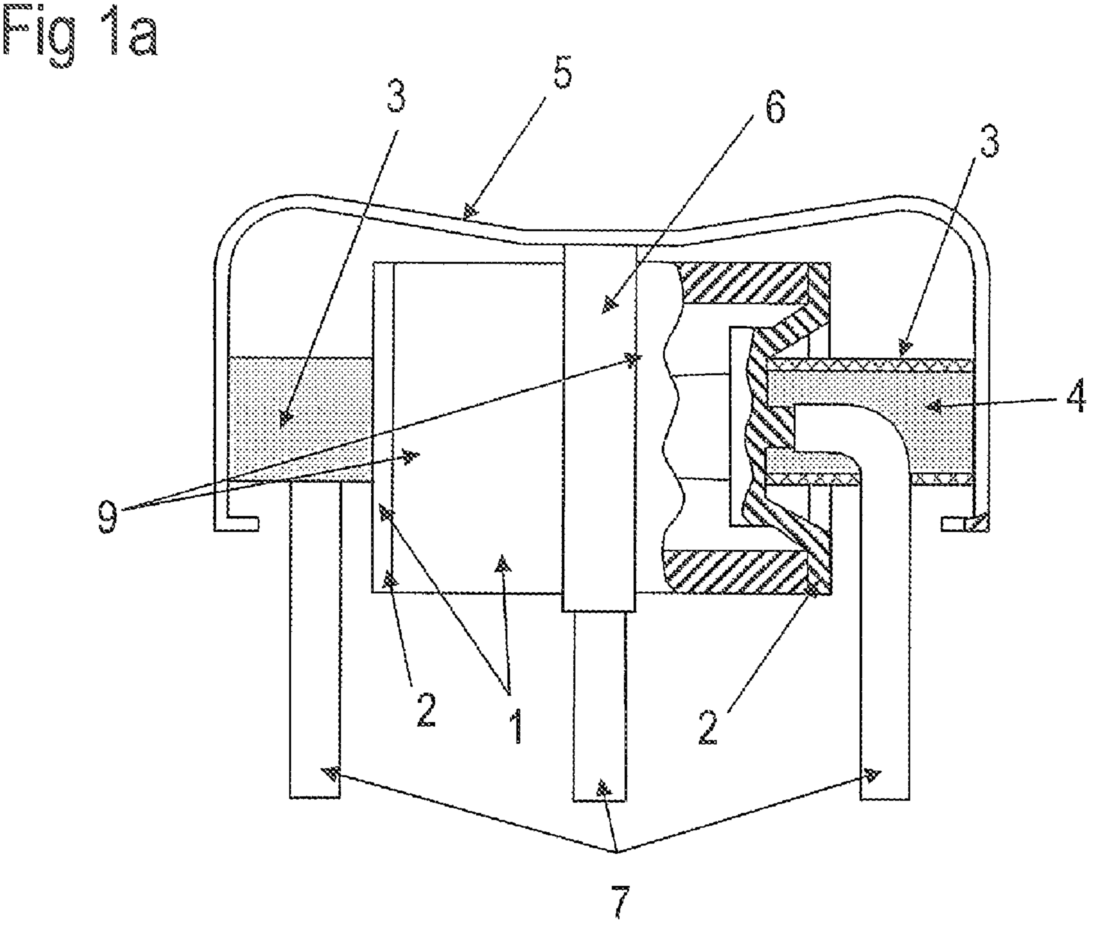
FIG. 1*a* shows an electrical protection component in a side view with tubular fusible elements at the end sides.

The following list of reference symbols can be used in conjunction with the drawings:

1 Surge arrester
2 Electrodes
3 Fusible element
4 Cavity
5 Short-circuiting link
6 Central electrode
7 Connection wire
8 Slot
9 Hollow body

DETAILED DESCRIPTION OF ILLUSTRATIVE EMBODIMENTS

Figure 1B:
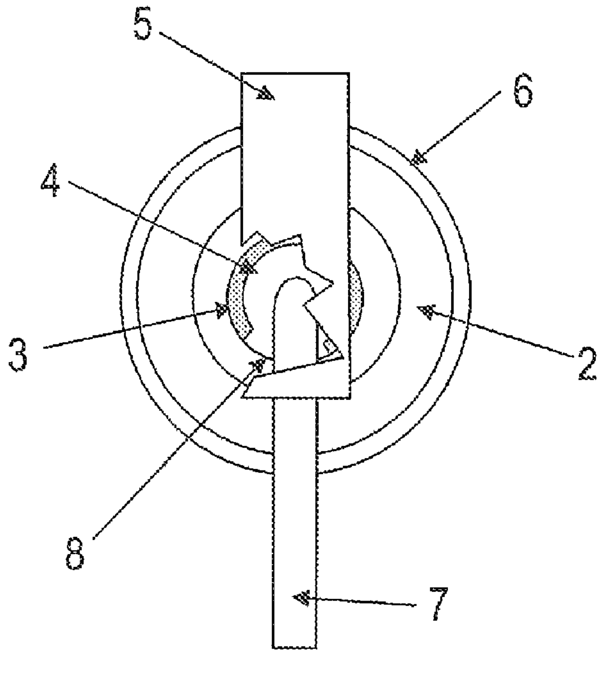
FIG. 1*b* shows the electrical protection component in accordance with FIG. 1*a* from the end side.

FIGS. 1*a* and 1*b* illustrate an electrical protection component comprising a surge arrester 1 with two hollow bodies 9 and three electrodes 2, 6. The surge arrester 1 comprises a respective electrode 2 at the end sides. Between the electrodes 2 arranged at the end sides, the surge arrester 1 comprises a central electrode 6 in the embodiment illustrated. The electrodes 2 and the central electrode 6 are provided with connection wires 7. A short-circuiting link 5 is arranged at the surge arrester 1, the short-circuiting link having an electrical contact with the central electrode 6.

A respective fusible element 3 is arranged at the electrodes 2 of the surge arrester 1 that are at the end sides. The fusible element 3 has a cavity 4. The fusible element 3 is preferably arranged between the electrodes 2 and the short-circuiting link 5 such that the greatest stiffness of the fusible element 3 is directed in the direction of the compressive force of the short-circuiting link 5 directed onto the fusible element 3. In the exemplary embodiment illustrated, the fusible element 3 has a tubular configuration, wherein the fusible element 3 is oriented with the openings of the tube in the direction of electrodes 2 and respectively in the direction of short-circuiting link 5. In an arrangement of this type, a tubular body has its greatest stiffness with respect to a force that acts on the tube perpendicularly in the direction of the longitudinal axis. An arrangement of this type makes it possible to use a fusible element 3 which has only a small amount of material in comparison with its dimensions. The tubular body of the fusible element 3 has a slot 8, through which the connection wire 7 of each electrode 2 is led. The slot 8 is illustrated in FIG. 1*b*.

In a further embodiment, a two-electrode arrester can also be involved, wherein the short-circuiting link in this case is mechanically connected to the surge arrester, for example, by means of a ring or a clamp in the region of the hollow body.

FIG. 1*b* shows a view of the electrical protection component from FIG. 1*a* looking at the end side of the surge arrester 1. The tubular fusible element 3 has a slot 8, through which the connection wire 7 of each electrode 2 is led. The electrical protection component illustrated is a three-electrode arrester. A third, central electrode 6 has an electrical contact with the short-circuiting link 5. In the event of impermissibly high heating of the surge arrester 1, the short-circuiting link 5 connects the electrodes 2 of the surge arrester 1 to the central electrode 6. In the exemplary embodiment illustrated, the central electrode 6 has a larger diameter than the body of the surge arrester 1.

Figure 2A:
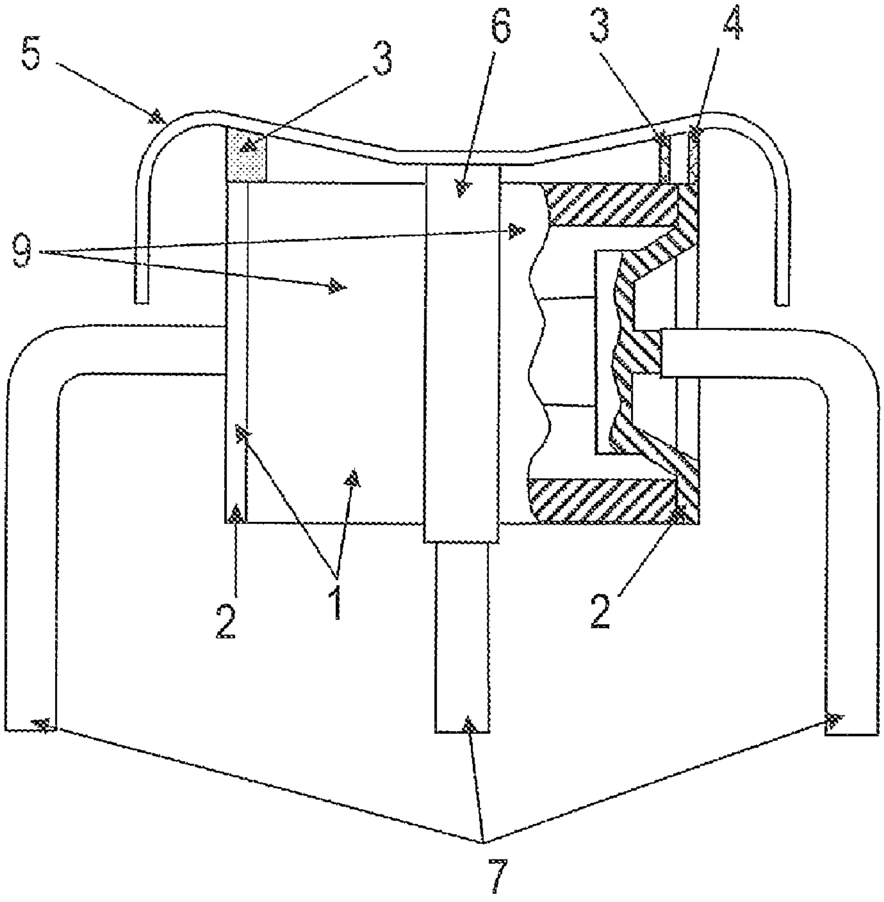
FIG. 2*a* shows an electrical protection component in a side view with cuboidal fusible elements between the surge arrester and the short-circuiting link.
Figure 2B:
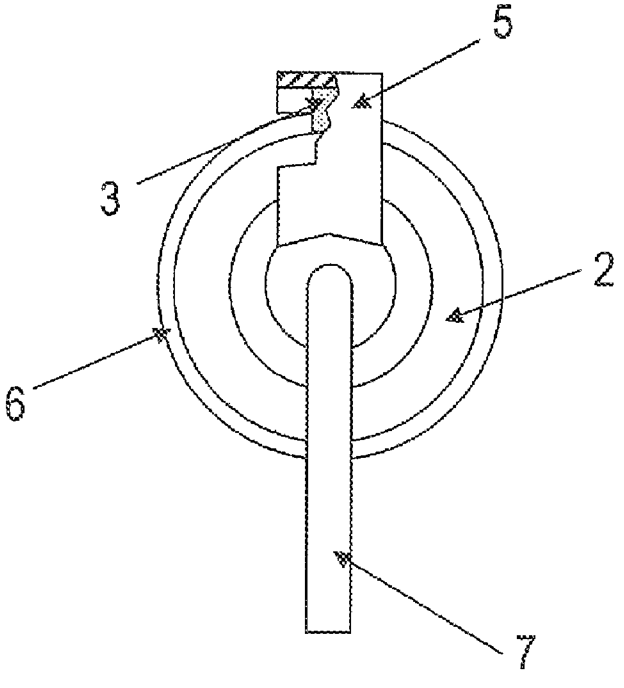
FIG. 2*b* shows the electrical protection component in accordance with FIG. 2*a* from the end side.

FIGS. 2*a* and 2*b* illustrate a further exemplary embodiment of an electrical protection component. The surge arrester 1 of the electrical protection component has two hollow bodies 9 and at least two electrodes 2. In the exemplary embodiment illustrated, a three-electrode arrester is involved, having a third, central electrode 6. The electrodes 2 and the central electrode 6 are provided with connection wires 7 for mounting purposes. The surge arrester 1 is provided with a short-circuiting device comprising a short-circuiting link 5. The short circuiting link 5 is spaced apart from the electrodes 2 of the surge arrester 1 by means of fusible elements 3. The short-circuiting link 5 is prestressed and presses onto the fusible elements 3. In the case of impermissibly high heating of the surge arrester 1, the fusible elements 3 melt, as a result of which the short-circuiting link 5 produces an electrical contact between the electrodes 2. As a result, a short circuit is produced between the two electrodes 2, as a result of which the surge arrester 1 is not heated further.

In the exemplary embodiment illustrated, the short-circuiting link 5 connects the two electrodes 2 to the central electrode 6. The fusible element 3 preferably has a cavity 4. As a result, the fusible element 3 has a small amount of material in comparison with the volume of the fusible element 3. As a result of the reduced amount of material of the fusible element 3, the fusible element 3 melts more rapidly than a solid fusible element 3 in the event of impermissibly high heating of the surge arrester 1. The cavity 4 of the fusible element 3 is preferably arranged in such a way that the fusible element 3 has its greatest stiffness in the direction of the compressive force acting on the fusible element 3 as a result of the short-circuiting link 5.

FIG. 2*b* shows a view of the electrical protection component from FIG. 2*a* from its end side. For protection against impermissibly high heating and the resultant possible destruction of the surge arrester 1, the latter has a short-circuiting device. The short-circuiting device comprises a short-circuiting link 5, which is spaced apart from the electrodes 2 of the surge arrester 1 by means of two fusible elements 3. The short-circuiting link 5 has an electrical contact with a central electrode 6 of the surge arrester 1. In the case of impermissibly high heating of the surge arrester 1, the fusible elements 3 melt and the short-circuiting link 5 produces a short circuit between the two electrodes 2 and the central electrode 6.

Although only a limited number of possible development of the invention could be described in the exemplary embodiments, the invention is not limited thereto. It is possible, in principle, to use any desired form of the fusible element, wherein geometrical forms which have one or a plurality of cavities and thereby have a smaller amount of material in comparison with a solid fusible element are particularly suitable.

The invention is not limited to the number of elements illustrated.

The description of the subjects specified here is not limited to the individual specific embodiments: rather, the features of the individual embodiments can be combined with one another in any desired manner insofar as is technically expedient.

What is claimed is:

1. An electrical protection component with a short-circuiting device, comprising:

a surge arrester comprising a plurality of electrodes that are located at end sides of the surge arrester;

a short-circuiting link arranged at the surge arrester; and a fusible element having a geometrical form comprising at least one cavity, wherein the fusible element comprises an insulating material, wherein the fusible element is located between one of the electrodes at the end sides and the short circuiting link;

wherein the short-circuiting link presses onto the fusible element, and wherein the short-circuiting link is spaced apart from the one of the electrodes by the fusible element, wherein the fusible element has a geometrical form comprising a slotted tube or a hollow cuboid or a planar material that is folded.

2. The electrical protection component according to claim 1, wherein the fusible element is embodied in tubular fashion.

3. The electrical protection component according to claim 1, wherein the fusible element has a form of a hollow cuboid.

4. The electrical protection component according to claim 1, wherein the fusible element has a geometrical form having at least one bend.

5. The electrical protection component according to claim 1, wherein the fusible element comprises a folded film.

6. The electrical protection component according to claim 1, wherein the fusible element is arranged at at least one end side of the surge arrester.

7. The electrical protection component according to claim 1, wherein the fusible element melts in the event of impermissibly high heating of the surge arrester.

8. The electrical protection component according to claim 1, wherein the short-circuiting link has an electrical connection to a central electrode.

9. The electrical protection component according to claim 1, wherein the fusible element comprises an insulating plastic.

10. The electrical protection component according to claim 1, wherein the fusible element comprises an injection-molded part.

11. The electrical protection component according to claim 1, wherein a stiffness of the fusible element is greatest in a direction of a compressive force exerted by the short-circuiting link.

12. An electrical protection component with a short-circuiting device, the component comprising:

a surge arrester comprising a plurality of electrodes that are located at end sides of the surge arrester;

a short-circuiting link arranged at the surge arrester; and a fusible element having a geometrical form comprising at least one cavity, wherein the fusible element is located between one of the electrodes at the end sides and the short circuiting link, wherein the fusible element has a geometrical form comprising a slotted tube or a hollow cuboid or a planar material that is folded;

wherein the short-circuiting link presses onto the fusible element such that the short-circuiting link is electrically insulated from the one of the electrodes by the fusible element, and wherein the fusible element is formed from a material that melts when heated above a melting temperature and the short-circuiting link is configured to press onto and be electrically connected to the one of the electrodes when the fusible element melts.

13. The electrical protection component according to claim 12, wherein the fusible element is embodied in tubular fashion.

14. The electrical protection component according to claim 12, wherein the fusible element has a form of a hollow cuboid.

15. The electrical protection component according to claim 12, wherein the fusible element has a geometrical form having at least one bend.

16. The electrical protection component according to claim 12, wherein the fusible element comprises a folded film.

17. The electrical protection component according to claim 12, wherein the fusible element is arranged at at least one end side of the surge arrester.

18. The electrical protection component according to claim 12, wherein the short-circuiting link has an electrical connection to a central electrode.

19. The electrical protection component according to claim 12, wherein the fusible element comprises an insulating plastic.

20. The electrical protection component according to claim 12, wherein the fusible element comprises an injection-molded part.

21. The electrical protection component according to claim 12, wherein a stiffness of the fusible element is greatest in a direction of a compressive force exerted by the short-circuiting link.

22. The electrical protection component according to claim 1, wherein the short-circuiting link has a geometrical form comprising a slotted tube.

23. The electrical protection component according to claim 1, wherein the short-circuiting link has a geometrical form comprising a planar material that is folded.

24. The electrical protection component according to claim 1, wherein the short-circuiting link has a geometrical form comprising a planar material that is folded.

* * * * *